United States Patent [19]

Eckler

[11] Patent Number: 4,978,741

[45] Date of Patent: Dec. 18, 1990

[54] METHOD FOR PREPARING ESSENTIALLY HAZE-FREE ISOPHTHALIC ACID- AND POLYMETHYLOLALKANOIC ACID-CONTAINING RESINS

[75] Inventor: Paul E. Eckler, Terre Haute, Ind.

[73] Assignee: Questra Chemicals Corp., Atlanta, Ga.

[21] Appl. No.: 449,147

[22] Filed: Dec. 15, 1989

Related U.S. Application Data

[63] Continuation of Ser. No. 149,842, Jan. 29, 1988, abandoned.

[51] Int. Cl.$^5$ .................... C08G 63/06; C07C 69/66
[52] U.S. Cl. .................... 528/279; 528/283; 528/302; 560/186
[58] Field of Search .................... 528/279, 283, 302; 560/186

[56] References Cited

U.S. PATENT DOCUMENTS

| | | | |
|---|---|---|---|
| 2,089,127 | 9/1937 | Lock | 560/189 |
| 2,488,303 | 11/1949 | Mack | 560/189 |
| 2,527,057 | 1/1948 | Canfield . | |
| 3,345,313 | 10/1967 | Ruhf | 528/303 |
| 3,345,330 | 10/1967 | Parker | 528/283 |
| 3,404,018 | 10/1968 | Hicks | 106/252 |
| 3,441,953 | 4/1969 | Dumont | 560/189 |
| 3,583,942 | 6/1971 | Malek et al. | 528/283 |
| 3,658,939 | 4/1972 | Carpenter | 528/288 |
| 3,669,939 | 6/1972 | Baker | 528/367 |
| 3,707,526 | 12/1972 | Gannon | 528/115 |
| 3,741,941 | 6/1973 | Ashe | 528/354 |
| 3,759,873 | 9/1973 | Hudak | 528/80 |
| 3,787,370 | 1/1974 | Shima . | |
| 3,792,112 | 2/1974 | Gannon . | |
| 3,882,189 | 5/1975 | Hudak | 528/303 |
| 4,046,739 | 9/1977 | Lacona | 528/283 |
| 4,093,595 | 6/1978 | Elliott . | |
| 4,133,786 | 1/1979 | Harris . | |
| 4,166,149 | 8/1979 | Mueller . | |
| 4,314,918 | 2/1982 | Birkmeyer | 528/161 |
| 4,320,222 | 3/1982 | Lopez | 528/89 |
| 4,356,285 | 10/1982 | Kumagai | 525/111 |
| 4,447,567 | 5/1984 | Geerdes | 523/501 |
| 4,528,356 | 7/1985 | Allen | 528/89 |
| 4,622,117 | 11/1986 | Geist | 528/100 |
| 4,649,082 | 3/1987 | Friedlander | 428/461 |
| 4,694,033 | 9/1987 | Van Der Linde . | |
| 4,798,859 | 1/1989 | Hohlein . | |
| 4,912,187 | 3/1990 | Eckler | 560/186 |

OTHER PUBLICATIONS

W. J. Van Westrenen, "Modern Developments in Aqueous Industrial Coatings", 62 J. Oil Col. Chem. Assoc., 246–255, (1979).

IMC/Pitman-Moore, "A Complete Guide To DMPA Brand of Dimethylopropionic Acid", revised Edition 1987.

*Primary Examiner*—John Kight, III
*Assistant Examiner*—Dennis R. Daley
*Attorney, Agent, or Firm*—Banner, Birch, McKie & Beckett

[57] ABSTRACT

A method of producing essentially haze-free isophthalic acid and polymethylolalkanoic acid-containing resins comprising reacting isophthalic acid, a polymethylolalkanoic acid, and a polyol in the presence of a catalytically effective amount of a catalyst selected from the group consisting of stannous oxalate, dibutyltin oxide, and tetrabutyl titanate at a temperature of between about 150° C. and 230° C. to produce haze-free resin.

23 Claims, No Drawings

METHOD FOR PREPARING ESSENTIALLY HAZE-FREE ISOPHTHALIC ACID- AND POLYMETHYLOLALKANOIC ACID-CONTAINING RESINS

This application is a continuation of application Ser. No. 149,842, filed Jan. 29, 1988, now abandoned.

BACKGROUND OF THE INVENTION

1. Field of the Invention

This invention relates to a method for producing essentially haze-free isophthalic acid- and polymethylolalkanoic acid-containing resins. More particularly, this invention relates to selectively catalyzing the esterification of the carboxyl moiety of isophthalic acid in preference to the carboxyl moiety of polymethylolalkanoic acid to produce essentially haze-free resins.

2. Description of Related Art

Polyol-polybasic acid, thermosetting (polyester) resin compositions are used extensively in preparation of paints, enamels, and other protective coatings. Both water-soluble and organic-soluble resins have been prepared, thus yielding both water-based and solvent-based protective coating compositions. Such compositions are commercially valued because resin compositions are relatively low cost, are easily applied, and yield high-gloss protective coatings which are resistant to attack by weather, adhere well to many substrates, and are tough and flexible.

Alkyd resins comprise a polyester resin modified with an oil, such as soybean oil, linseed oil, and the like, or a refined fatty acid. Alkyds are relatively economical vehicles for solvent-based paint products. The oil or fatty acid component is incorporated into the resin molecule to modify the properties of the resin, for example, to make the alkyd resin suitable for use in protective coating products which air dry at ambient temperature. Metal catalysts may be incorporated into the coating product to catalyze the crosslinking of the unsaturated oil or fatty acid side chains. Those polyester resins containing no side-chain unsaturation are usually cured by baking.

Both polyester and alkyd resins can be made water soluble, typically by incorporation of water-solubilization moieties such as free acid groups. The acid group is solubilized by neutralization, as described herein.

Water-soluble alkyd resins are preferred because of the enactment of regulations which restrict the quantity of organic solvent that can be introduced into the environment per volume of coating product and because of the newly-heightened awareness of the toxicity and flammability of organic solvents. Further, not only is the cost of water typically lower than the cost of suitable organic solvents, but also water-borne coatings are easily and less expensively applied. Where organic solvents are required for cleaning equipment and, for example, for removal of coating accidentally applied to a surface, water-borne material requires only water for these purposes.

Typically, an alkyd resin or polyester resin prepared from only polyols and polybasic acid constituents is not water-soluble. Therefore, water soluble moieties must be incorporated into the resin. A constituent having a functional group, such as a carboxyl group, which can be made water soluble, is incorporated into the resin in a first step. Thereafter, the functional group is reacted to convert it to a water-soluble moiety and make the resin water soluble.

Various constituents, such as trimellitic anhydride, can conveniently be incorporated into an alkyd or polyester resin through esterification of the anhydride group with hydroxyl groups on resin molecules. The third carboxyl-functional group remains unreacted, and, upon reaction with an amine or ammonium hydroxide, increases the water solubility of the resin.

Polymethylolalkanoic acids are especially suitable to provide water solubility. When such an acid is incorporated into resin by esterification of methylol moieties, the carboyl moiety remains unreacted, and can be reacted to make it water soluble, as described above. However, a polybasic coupling acid must be utilized to incorporate polymethylolalkanoic acid in this manner. One carboxyl group on the coupling acid esterifies a methylol moiety on the polymethylol-alkanoic acid, while a second carboxyl group esterifies a hydroxyl group on the resin molecule.

Aromatic dibasic acids such as phthalic acid or anhydride and isophthalic acid are often used as the polybasic component in alkyd resin formulations. In water soluble alkyd resins used in protective coatings, isophthalic acid is preferred over phthalic acid or anhydride. In the case of water soluble resins, there exists the possibility that the ester linkages will hydrolyze. Isophthalic acid is preferred because it is believed to improve the hydrolytic stability of water-borne ester resins produced therefrom.

Various methods of producing polyesters as precursors to polyurethanes, polyureas, and other alkyd resins, are known in the art. For example, U.S. Pat. No. 3,658,939 discloses use of a carboxyl containing organic diol, such as dimethylolpropionic acid, to extend the chain length of a polyurethane. Other components of these polyurethanes are polyester polyols prepared by the esterification of of dicarboxylic acid or anhydride using a linear alpha,omega-diol in the presence of a catalyst such as dibutyltin oxide or stannous oxalate with lithium acetate. These polyester polyols are used in combination with isocyanates to form polyurethanes.

A method for preparing aromatic polyesters is disclosed in U.S. Pat. No. 4,093,595. According to the method, dihydric phenol and aromatic dicarboxylic acid are directly polymerized in the presence of an esterification catalyst selected from the group consisting of antimony, tin, and titanium compounds. In U.S. Pat. No. 4,166,149, polyesters which are the reaction products of dihydric alcohols with dibasic carboxylic acids are combined with diisocyanate to yield a urethane prepolymer. Then, diamine chain extenders are introduced to increase the molecular weight of the resulting polyurethane polymers.

U.S. Pat. No. 4,356,285 is directed to thermosetting resins and to methods of making them. One of the components of the resin is the reaction product of a carboxylic acid and an alcohol. Formation of this reaction product can be catalyzed by organometallic, metal oxide, metal acetate, or metal alkoxide catalysts. The reaction product is one component in the thermosetting resin.

A method for producing essentially linear polyesters having low carboxyl content is disclosed in U.S. Pat. No. 3,787,370. Although the patent is directed to the use of orthocarbonate catalysts for the esterification, the specification describes a known reaction of aliphatic dicarboxylic acid or hydroxycarboxylic acid with glycol, optionally in the presence of known esterification catalysts, to produce a glycol ester. This glycol ester subsequently is polycondensed, liberating a glycol molecule in the process. The polycondensation proceeds at an exceedingly slow rate, even when antimony-, titanium-, or germanium-containing catalysts, or catalysts such as zinc acetate, manganese acetate, or lead oxide, are used.

None of the above-described patents teaches a method whereby polymethylolalkanoic acids are utilized to improve the water-solubility of alkyd resin. However, various two-step processes for including water-solubilizing agents in polyesters which are part of alkyd resins are known in the art. One such process is described in U.S. Pat. No. 3,345,339. In a first step, isophthalic acid, terephthalic acid, or a mixture thereof, is esterified with a polyol in the presence of inorganic tin salt esterification catalyst. The second step adds an alpha, beta-unsaturated polycarboxylic acid to the resin. In an example in the patent, a resin comprising the polyethylene glycol ester of terephthalic acid is prepared, then is reacted in a second stage to incorporate maleic anhydride into the structure and produce an acceptable haze-free product. Simultaneous reaction of these components in one stage, however, yields an unacceptable product that was not haze-free.

Other known two-stage processes use butyl stannoic acid, tetrabutyl titanate, stannous oxalate, and dibutyltin oxide as esterification catalysts. Typically, in the first stage, an alkyd resin is prepared, and a solubilizing agent is incorporated in a second stage. Trimellitic anhydride is commonly incorporated in such a process; dimethylolpropionic acid also can be utilized. However, isophthalic acid cannot be used as the coupling acid for dimethylolpropionic acid because the carboxyl moiety of dimethylolpropionic acid tends to react faster than isophthalic acid. Thus, isophthalic acid does not completely react and makes the resin hazy.

A method for manufacturing water-soluble alkyd resins is disclosed in U.S. Pat. No. 3,345,313. Therein, a polyhydric alcohol, a polycarboxylic acid or anhydride, and a polymethylolalkanoic acid having between about five and seven carbon atoms are reacted together without catalyst to produce a condensation polymer containing free carboxyl moieties. The patent notes that these carboxyl functionalities can be modified to increase the solubility of the resin. The polymethylolalkanoic acid is incorporated into the polymer chain by esterifying the acid groups on the polycarboxylic acid with the hydroxyl moieties on the polymethylolalkanoic acid. Because the carboxy moiety on the polymethylolalkanoic acid is sterically hindered, uncatalyzed esterification of this moiety, if it occurs at all, proceed exceedingly slowly. Thus, the carboxyl moiety on the hindered alkanoic acid does not react under mild conditions taught in the patent, i.e., no catalyst and reaction times of up to 30 hours.

These methods are unsatisfactory, as they do not provide a method for producing a water-soluble, essentially haze-free resin containing isophthalic acid and polymethylolalkanoic acid wherein isophthalic acid is essentially completely reacted in the presence of polymethylolalkanoic acid. Because isophthalic acid is not soluble in resins, incomplete esterification thereof can lead to its crystallization in the resin product. Not only is the appearance of a hazy resin commercially and cosmetically unacceptable, but also isophthalic acid crystals will probably generate film defects in a protective coating. Although a minor amount of haze can be tolerated, excessive resin haze typically is removed by filtration to make the resin commercially acceptable. If the crystals do not appear until the product has been shipped, or worse, until the product has been used and the protective coating has failed, the manufacturer of the resin will be faced with the significant costs of rectifying the situation, and may be faced with the loss of a customer.

Two-step processes, such as the one disclosed in U.S. Pat. No. 3,345,339, are unsatisfactory for several reasons. Addition of the polymethylolalkanoic acid in the second stage of the reaction requires the addition of solids to a heated reaction vessel. Such an operation is hazardous and typically is very difficult. Further, the viscosity of the reactant mixture may increase rapidly, making agitation difficult, or a gel may form, thus yielding an unacceptable product.

The range of products obtained from such two-step processes typically is limited. For example, the product of U.S. Pat. No. 3,345,339 is an unsaturated polyester not suitable for use in a protective coating product. Inclusion of polyhydroxymonocarboxylic acid into a polyester without esterifying the carboxyl moiety of the polyhydroxymonocarboxylic acid requires the use of coupling acids. Where water-solubility is desired without regard to the drying characteristic of the resin, acids such as adipic acid and azeleic acid are suitable coupling agents. However, because these acids are detrimental to the air-drying characteristic of resins thus made, phthalic anhydride typically is used in air-drying alkyd resin compositions. Phthalic anhydride often is perceived as commercially unacceptable, and the demand for resin containing only isophthalic acid is high. Although isophthalic acid would be a suitable coupling acid, its use in known one-step methods is precluded by the above-described haze formation problem.

It is an object of this invention to provide a method for producing essentially haze-free isophthalic acid- and polymethylolalkanoic acid-containing resins.

It is another object of this invention to provide a method for producing essentially haze-free isophthalic acid- and polymethyl olalkanoic acid-containing resins in one stage or reaction step.

It is yet another object of this invention to provide a method for selectively esterifying the carboxyl moiety of isophthalic acid in preference to the carboxyl moiety of polymethylolalkanoic acid to produce essentially haze-free water-soluble resins.

It is still another object of this invention to provide alkyd and polyester resins comprising essentially haze-free isophthalic acid- and polymethylolmonocarboxylic acid-containing resins.

It is a further object of this invention to provide a method for producing a polyester or alkyd resin comprising polymethylolalkanoic acid as a water-solubilizing moiety incorporated into the ester by esterification of a methylol moiety thereon with isophthalic acid.

It is still a further object of this invention to provide protective coating products comprising these polyester and alkyd resins, and objects protected with the coatings.

SUMMARY OF THE INVENTION

In accordance with these and other objects, this invention relates to a method of producing essentially haze-free isophthalic acid- and polymethylolalkanoic acid-containing resins comprising:

reacting isophthalic acid, a polymethylolalkanoic acid, and a polyol in the presence of a catalytically effective amount of a catalyst selected from the group consisting of stannous oxalate, dibutyltin oxide, and tetrabutyl titanate at a temperature of between about 150° C. and 230° C. to produce an essentially haze-free resin.

The invention also relates to the essentially haze-free isophthalic acid- and polymethylolalkanoic acid-containing resins produced by the method, protective coating products comprising such resins, and objects coated with these products.

DETAILED DESCRIPTION OF THE INVENTION

The principal components of polyester resins are polybasic (polycarboxylic) acids and polyols. Alkyd resins further comprise unsaturated fatty acids and oils. Polymethylolalkanoic acid is included in the resin structure to increase the water-solubility of the resin. It can also be used to lengthen the polymer chain by simultaneously reacting with two discrete polymer molecules to form one molecule incorporating the polymethylolalkanoic acid.

Polymethylolalkanoic acid increases the solubility of the resin by providing an unreacted carboxyl moiety. This carboxyl moiety can be modified by treatment with base or an amine to increase the resin solubility. Therefore, the polymethylolalkanoic acid must be incorporated into the resin molecule by reaction only with the hydroxyl moieties of the acid; the carboxyl moiety must remain sufficiently unreacted to retain water-solubility.

When the polycarboxylic acid is isophthalic acid, it is difficult to incorporate polymethylolalkanoic acid into a resin in a single-stage reaction to increase the water-solubility of the resin, for reasons described above. However, it has been discovered that polymethylolalkanoic acid can be incorporated in a single stage into an isophthalic acid-containing resin to increase the water-solubility of the resin without hazing by selectively esterifying the carboxyl moieties of the isophthalic acid while satisfactorily avoiding the esterification of the carboxyl moiety of the polymethylolalkanoic acid to an extent which would otherwise destroy water solubility. This selective esterification is accomplished using a catalyst selected from the group consisting of tetrabutyl titanate, stannous oxalate, and butyl stannoic acid. The catalyst ensures that the isophthalic acid is essentially completely esterified while the carboxyl moiety of the polymethylolalkanoic acid is sufficiently unreacted. The polymethylolalkanoic acid is included in the molecule by reaction of its hydroxyl moieties with the carboxyl moieties of isophthalic acid.

Those skilled in the art recognize that the properties of resins are affected by their composition. Based on the present disclosure, skilled practitioners will be able to select compositions which will yield either a polyester resin or an alkyd resin having preselected properties. Not only the identity but also the relative proportions of the polyol, oil or fatty acid, polymethylolalkanoic acid, and isophthalic acid affect the properties of the resulting resin.

Suitable polyols have at least two hydroxyl moieties. Typical of such polyols are glycerol; straight-chain glycols, like ethylene glycol, trimethylene glycol, tetramethylene glycol, pentamethylene glycol, octamethylene glycol, and similar, well-known polymethylene glycols; branched-chain glycols, such as neopentyl glycol, 2-methylpentanediol and 3-methyl-hexanediol; propanediol; 1,4-cyclohexanedimethanol; 2,2,4-trimethylpentanediol-1,3; the pentaerythritols, such as mono-, di-, and tripentaerythritols; trimethylolalkanes, like trimethylolethane, trimethylolpropane, and trimethylolbutane; 1,2,6-hexane triol; the hexols, like sorbitol; and the like.

Polyester polyols, including polymer polyols, also are suitable for use in resins produced in accordance with the method of this invention. Such polyols are often used in making urethane polymers, and are available in a wide variety of molecular weights. Preferred herein are those polyester polyols having molecular weights between about 300 and 2000. Those skilled in the art recognize that many such polyester polyols are available. Further, blends of two or more of the simple or polyester polyols may be utilized simultaneously. The polyols may be pure, or technical grades may be used.

Other polyols also are suitably used in this invention. One example of such a polyol is Esterdiol 204®, a neopentyl ester polyol product sold by Union Carbide. Other examples are propoxylated bisphenol A and ethoxylated bisphenol A, polyether polyols (glycol ether polyols), sold by Milliken Chemicals. These products are preferred for water-soluble resins because of its relatively high equivalent weight, i.e., molecular weight per hydroxyl moiety at least about 200.

Polymethylolalkanoic acids suitably used in this invention are those sterically hindered acids having between 5 and 7 carbon atoms, including trimethylolacetic acid, dimethylolpropionic acid, dimethylolbutyric acid, and dimethylolvaleric acid. Again, blends of two or more of these acids also may be used. Preferably, dimethylolpropionic acid is utilized.

Polyester resins produced in accordance with the method of the invention may be modified with oils and fatty acids to produce alkyd resins. Methods for producing such alkyd resins are known in the art. These oils, fatty acids, and other alkyd resin components preferably are incorporated into the resins of the invention in a pre-polymer comprising, for example, the polyol component. This pre-polymer is an alkyd resin, and typically is a reaction product of a fatty acid, polyol, and polybasic acid. The pre-polymer is itself a polyol, as it is a hydroxyl-terminated molecule. Further, isophthalic acid may be a component of such a pre-polymer. The pre-polymer can be prepared in a first stage, with additional isophthalic acid, the polymethylolalkanoic acid and the pre-polymer reacted simultaneously in a second stage.

Suitable fatty acids for preparing the alkyd resin polyols include monobasic acid such as tall oil fatty acid, soybean fatty acid, linseed oil fatty acid, octanoic acid, pelargonic acid, decanoic acid, lauric acid, rosin, and the fatty acids derived from other glycerine oils such as castor oil, coconut oil, sunflower oil, cotton seed oil, safflower oil, fish oil, and the like; and monoglycerides, which are obtained by the alcoholysis of glycerine triesters with polyols or the acidolysis of glycerine triesters with dibasic acids, as is well known in the alkyd art.

Other monobasic acids include 8/10 acid (a blend of octanoic and decanoic acids available from Emery Chemical), 12-hydroxystearic acid, isostearic acid, linoleic acid, myristic acid, neodecanoic acid, neopentanoic acid, oleic acid, palmitic acid, stearic acid, and tallow fatty acid.

Suitable oils for preparing the alkyd resin polyols include animal grease, canola (rape seed oil), castor, dehydrated castor, hydrogenated castor, coconut, corn, cottonseed, fish, lard, linseed, oiticica, palm kernel, peanut, perilla, safflower, soya, sunflower, tallow, tung, and walnut.

Other suitable oils and fatty acids are known to practitioners of the art. Those skilled in the art recognize that blend of these components may also be used.

As noted above, the characteristics and properties of resins produced in accordance with the method of this invention depend upon not only the identity of the components but also the relative quantities thereof. Thus, for the purposes of this invention, relative quantities of isophthalic acid and polyol can be any quantities which yield polyester or alkyd resin. However, the water solubility of the resin is derived from the carboxyl moiety on the polymethylolalkanoic acid. Although resin having any acid number can be prepared in accordance with the method of this invention, those skilled in the art recognize that, to yield a resin which can be made water soluble, the alkyd resin desirably has an acid number of at least 30, preferably between about 30 and 75, more preferably between about 40 and 60. It is preferred that the acid number of the resin not exceed 75 because the acidity of a resin having a higher acid number reduces the quality of coating products comprising the resin. The acidity of such a resin induces corrosion of objects coated with products comprising the resin. The quantity of polymethylolalkanoic acid preferred in the method of the invention therefore is that quantity which provides an acid number of between about 30 and 75, more preferably between about 40 and 60.

Acid number, also referred to as acid value, is the number of milligrams of potassium hydroxide (KOH) required to neutralize the acid in one gram of resin. The value is determined by methods known to practitioners. Typically, a weighed sample of resin is dissolved in a neutral solvent and is titrated with 0.1N potassium hydroxide in methanol to a phenolphthalein end point. The neutral solvent is selected in accordance with the nature of the sample. A preferred solvent for the resins of the invention is a blend of equal volumes of toluene and isopropanol.

Although any isophthalic acid-containing resin can be made in accordance with the method of this invention, the viscosity of the reaction mixture and resulting resin can be quite high if the isophthalic acid content of the resin exceeds about 40 weight percent. Thus, such products will be difficult to agitate. This does not, of course, prevent their manufacture in accordance with the method of this invention.

Resins can be prepared by either batch or continuous process. The reactants, including the catalyst, can be introduced into the reaction zone in any suitable manner, preferably simultaneously. The reaction vessel preferably is maintained under one atmosphere pressure of an inert component, such as carbon dioxide or nitrogen, and is heated to a preselected reaction temperature. The progress of the reaction is monitored by the acid number of the resin and other methods known in the art, such as determining the quantity of water liberated from the reactor, the viscosity, or the cure times on a cure plate. The reaction mixture can be stirred or otherwise agitated. Reaction is continued until the viscosity, as determined with an ICI cone and plate viscometer at 125° C. and 100 percent solids, is at least about 10 poise, preferably is about 20 poise.

The temperature of the reactant mixture is raised to between about 150° and 230° C., preferably between about 180° and 210° C. The selectivity of the catalyst decreases at higher temperatures. Water, a by-product of the esterification, typically is removed, as by distillation. The time required to complete the reaction and produce the isophthalic acid- and polymethylolalkanoic acid-containing resin varies with the relative quantity and identity of the components, the temperature, and the identity of the catalyst. Typical reaction times range between about 3 and 24 hours.

The quantity of catalyst utilized in the method of the invention is up to about 1 weight percent, based on the total weight of the reactants, preferably between about 0.05 and 0.5 weight percent, and more preferably between about 0.075 and 0.25 weight percent. Catalyst is available in many forms (liquid, dry granules or powder, and the like). Any form which is not incompatible with the remainder of the reactants conveniently is utilized in the practice of the method of the invention.

Stannous oxalate is a preferred catalyst. Because it is insoluble in resin, it is possible to remove most of the catalyst by post-reaction filtration. Removal of the catalyst is desirable because the principle of microscopic reversibility implies that an active esterification catalyst will also catalyze hydrolysis. Therefore, reduced resin hydrolytic stability is expected if the catalyst cannot be somehow inactivated or removed. Filtration of an insoluble catalyst is a facile way of removing the catalyst.

Dibutyltin oxide is a highly active catalyst and its selectivity is concentration dependent. Therefore, the concentration of dibutyltin oxide in the reactant mixture must be carefully adjusted to obtain predictable results. Charging too much catalyst could produce an unacceptable resin or a gel. An excess of catalyst, or catalyst which catalyzes the esterification of the polymethylolalkanoic acid carboxyl moiety to a great degree (i.e., is not sufficiently selective), may yield a gelled product. Esterification of polymethylolalkanoic acid carboxyl moieties provides an opportunity for cross linking and creation of highly branched resins which may gel. This situation obviously is undesirable and should be avoided.

Any of the known adjuvants, solvents, additives, diluents, and the like may be included in the reaction mixture or added during the reaction, providing that they do not interfere with the ultimate formation of a water-soluble alkyd resin. Further, the resin can be modified fatty acids in a manner known in the art.

Resin produced by the method of this invention may be modified with fatty acids, as described above, or may be utilized in any manner known in the art for alkyd resins. The resin and its derivatives are suitably used in protective coatings. Unsaturation of the oil or fatty acid component makes coating products containing the resins suitable for air drying. Further, the low haze of the resin makes it particularly suitable for use in clear coating products.

Upon completion of the reaction, a resin can be "let down," i.e., diluted by addition of solvent or diluent, to reduce viscosity and facilitate handling. Preferred let-down solvents are high-boiling point, water-soluble solvents such as butoxyethanol (Butyl Cellosolve). Sometimes, lower boiling alcohols such as butanol are used in conjunction with the let-down solvent. Water is a suitable but seldom-used choice of diluent. Any quantity of solvent or diluent can be utilized. Conveniently, the quantity of solvent is selected to yield a resin product having a pre-selected solids content. A solids content of at least about 70 percent is preferred where the resin product is subsequently used in protective coating products. The resin may be filtered either before or after being let down.

The carboxyl moiety of polymethylolalkanoic acid is modified to form a water-solubilizing moiety by reacting it with base or amine. Preferred solubilizing moieties include ammonia, triethylamine, dimethylethanolamine, 2-amino-2-methyl-1-propanol, and blends thereof. Lower aliphatic amines, such as ethanolamine, methylamine, and the corresponding secondary and tertiary amines, are also suitable. Other suitable bases and amines are known to those skilled in the art. Amines are useful because, upon application of the protective coating, evaporation of the amine reconverts these groups to the free acid, and thereby increases the water resistance of the coating. The solubilizing agent may be added to the diluent or solvent used to reduce the resin's solids content.

The characteristics of the particular reactants employed and their relative amounts, the particular catalyst used and its amount and the reaction conditions, including temperature, all influence the properties of the resulting resin. Those skilled in the art, guided by the present disclosure and subsequent examples and using only routine experimentation, will be able to select the best combination of conditions for producing an essentially haze free resin.

The following examples are intended to illustrate the invention and to augment the disclosure, not to limit the invention to these embodiments. The scope of the invention is limited only by the appended claims.

EXAMPLE I

Resins were prepared in accordance with the method of this invention in apparatus consisting of a mantle-heated two-liter resin flask equipped with a stirrer, a nitrogen inlet tube extending to within 2 inches of the bottom of the resin flask, a steam heated partial condenser, followed by a modified Dean-Stark trap equipped with a head thermometer, and a water cooled condenser.

Preparation of the resin was begun by introducing nitrogen into the apparatus at between 50 to 60 cc/min. Then the fatty acid was added. Heating was begun. Then the remaining materials were added in rapid succession. In each case, catalyst was added to achieve 0.1 weight percent on polymethylolalkanoic acid.

Heat was applied as quickly as possible until the desired temperature, typically 205° C., was reached. This temperature was maintained throughout the remainder of the process, unless otherwise noted. As the esterification reaction occurred, water which distilled from the resin flask was collected in the Dean Stark trap. The head temperature was maintained below 105° C. Temperatures and the volume of water distilled were followed until the rate of water evolution declined and the head temperature began to fall. Then acid value and ICI viscosity determinations were begun. Heating was discontinued when the desired acid value and ICI viscosity were reached. In the event that the desired acid value could not be achieved in one day, the cooks were cooled to room temperature and held under nitrogen overnight. Cooking was then completed on the following day.

When the desired criteria were reached, the heat was turned off, and the resin was allowed to cool under nitrogen to 150° C. It was then let down in solvent (4:1 by volume butoxyethanol/s-butyl alcohol) to 75% NVM (non-volatile material) by weight. The let down was conducted by adding a calculated amount of solvent to a tared stainless steel beaker, and adding the hot resin to this solvent with stirring. The actual weight of resin recovered was determined by difference and additional solvent was added to bring the resin to the desired solids level. The resin was then packaged in an unlined paint can for storage.

EXAMPLE A

Resin was prepared in accordance with the above-described method by reacting 300 grams linoleic acid (Hercules Pamolyn 200 ®), 259 grams trimethylolethane, 367 grams isophthalic acid, 116 grams benzoic acid, and 72 grams dimethylolpropionic acid in the presence of 1 gram stannous oxalate by cooking at 205° C. The finished resin had no haze, and had an ICI viscosity of 20 poise at 150° C. and an acid value of 37. After let-down, the resin had a Gardner viscosity of Z-10+ and a color of 8.

EXAMPLE B

A resin was prepared in accordance with the above-described method using 367 grams linoleic acid (Hercules Pamolyn 200 ®), 231 grams trimethylolethane, 311 grams isophthalic acid, 115 grams benzoic acid, 84 grams dimethylolpropionic acid, and 1 gram stannous oxalate. The final resin had only slight haze, an ICI viscosity of 12.8 poise at 125° C., and an acid value of 35.6. After let-down, the resin had a Gardner viscosity of Z-4 and a color 7-8.

EXAMPLE C

A resin was prepared using the above-described method by combining 233 grams Pamolyn 200 ®, 342 grams trimethylolethane, 253 grams isophthalic acid, 198 grams benzoic acid, 92 grams dimethylolpropionic acid, and 1 gram stannous oxalate. The ICI viscosity of the resin was 31.2 poise at 125° C., and the resin had an acid value of 45.3. After let-down, the resin had a Gardner viscosity of Z-7-, color of 8, and very low haze.

EXAMPLE D

A resin was prepared in accordance with the above-described method using 233 grams Pamolyn 200 ®, 45 grams trimethylolethane, 480 grams isophthalic acid, 268 grams neopentyl glycol, 97 grams dimethylolpropionic acid, and 1 gram stannous oxalate. The resin had an ICI viscosity of 29.6 poise at 125° C. and an acid value of 41.7. After let-down, the Gardner viscosity was Z-7+, and the product had a color of 7 with slight haze.

EXAMPLE E

A resin was prepared in accordance with the above-described method using 233 grams Pamolyn 200 ®, 247 grams trimethylolethane, 334 grams isophthalic acid, 186 grams benzoic acid, 25 grams cyclohexanedimethanol, 90 grams dimethylolpropionic acid, and 1 gram stannous oxalate. The resin had an ICI viscosity of 14.0 poise at 125° C. and an acid value of 36.8. After let-down, the clear product had a color of 5 and a Gardner viscosity of Z-4.5.

EXAMPLE II

To illustrate the suitability of the invention in multiple-stage reactions, resin pre-polymers (polyols) containing isophthalic acid were prepared, and then incorporated into resins according to the method of this invention wherein both isophthalic acid and dimethylolpropionic acid were present simultaneously as reacting materials.

EXAMPLE F

A pre-polymer was prepared by the reacting 192 grams linoleic acid, 401 grams trimethylolethane, 326 grams isopthalic acid, and 193 grams benzoic acid in a fusion cook at 230° C. A 345 gram portion of this pre-polymer then was mixed with 36 grams dimethylolpropionic acid, 50 grams Pamolyn 200 ®, and the quantity of isophthalic acid and stannous oxalate (wt percent based on weight of total charge) listed in the table below. The resin was prepared at 250° C. until the acid value in the table was reached, at which time the resin was let-down to 75 percent NVM in 4:1 by volume butoxyethanol/s-butyl alcohol.

| Example | Stannous Oxalate | IPA g | Haze | Poise ICI/°C. | Acid Value | Gardner Viscosity |
|---|---|---|---|---|---|---|
| F1 | 0.50% | 90 | Some | 17.2/150 | 54.2 | |
| F2 | 0.10 | 81 | Little | 18.8 | 38.4 | Z-6 |

EXAMPLE G

A resin similar in composition to that of Example C above was prepared in two charges. In the first charge, 133 grams Pamolyn 200 ®, 136 grams isophthalic acid, 253 grams trimethylolethane, and 198 grams benzoic acid were combined and cooked at 230° C. until the acid value was 8.9. Thereafter, 100 grams Pamolyn 200 ®, 205 grams isophthalic acid, 92 grams dimethylolpropionic acid, and 1 gram stannous oxalate were added and cooked at 205° C. The product had an ICI viscosity of 28.8 poise at 125° C. and an acid value of 33. The Gardner viscosity was Z-6—, color was 5-6, and the product was almost clear after being let-down.

EXAMPLE H

Following the method of Example G, 133 grams Pamolyn 200 ®, 231 grams isophthalic acid, 182 grams trimethylolethane, 135 grams benzoic acid, and 121 grams Esterdiol 204 ® were reacted. Then, 100 grams Pamolyn 200 ®, 114 grams isophthalic acid, 92 grams dimethylolpropionic acid, and 1 gram stannous oxalate were added and the reactants were cooked until the acid value was 45.2. The ICI viscosity of resin was 19.2 poise at 125° C., and, after being let-down, the Gardner viscosity was Z-5—, the color was 6, and the resin was clear.

EXAMPLE I

In accordance with the method described in Example G, 180 grams Pamolyn 200 ®, 218 grams isophthalic acid, 243 grams trimethylolethane, and 167 grams benzoic acid were reacted. Then, 100 grams Pamolyn 200 ®, 114 grams isophthalic acid, 92 grams dimethylolpropionic acid, and 1 gram stannous oxalate were reacted until the acid value was 42.2. The Gardner viscosity was Z-5+, color was 6 and product was clear after being let-down. The ICI viscosity of the resin at 100% solids was 18.8 poise at 125° C.

All of the Examples above were soluble in water when neutralized with ammonia in the presence of butoxyethanol.

EXAMPLE III

Solutions of selected resins from the Examples above were prepared using the formulations shown below. The resins were evaluated for their solubility in water when neutralized with ammonia in the presence of coupling solvent. The increased quantity of butyl cellosolve coupling solvent was utilized in an attempt to increase the solubility of the resins.

First, the dryer pre-mixed formulation was prepared, after which the clear formulation was made. The ammonia content of the formulation was adjusted as required to obtain a pH greater than 8.5.

| Drier Premix | |
|---|---|
| Exkin No. 2 antiskinning agent | 1.9 |
| 18% Zirco, Interstab | 2.1 |
| 6% Cobalt Napthenate, Interstab | 7.0 |
| Butyl Cellosolve coupling solvent | 35.3 |
| Byk 301 wetting agent | 3.7 |
| | 50.0 |

| Clear Formulation | Standard | High Butyl Cellosolve |
|---|---|---|
| Resin, 75% NVM | 34.8 | 34.8 |
| Ammonia, 28% | 2.3 | 1.7 |
| s-Butyl Alcohol | 1.7 | 1.7 |
| Butyl Cellosolve | — | 5.0 |
| Drier Premix | 2.8 | 2.8 |
| Water, distilled | 58.4 | 58.4 |

The following table illustrates the characteristics of the clear protective coating compositions:

| Resin | Standard | High Butyl Cellosolve |
|---|---|---|
| B | Slightly Hazy | Clear |
| C | Hazy | Clear* |
| E | Hazy | Very Hazy |
| G | Hazy | Slightly Hazy* |

*A white precipitate deposited on standing overnight.

EXAMPLE IV

Drying times were determined on clear solutions utilizing the high butyl cellosolve concentration from Example III. The test was run at two relative humidities, 46% and 67%, as summarized in the table below. Tests were run on Q panels (cold rolled steel) and films were applied with a wire wound rod. All data are in hours.

| Resin | STT | Empty Zapon | 500 g Zapon | Through Dry | Pencil Hardness |
|---|---|---|---|---|---|
| 1 mil dry film; 46% RH; 75° F.; #80 wire wound rod | | | | | |
| B | 2:22 | 3:28 | 8:40 | >8 | |
| 1 mil dry film; 67% RH; 75° F.; #64 wire wound rod | | | | | |
| C | 1:41 | 2:42 | 5:24 | >8 | B |
| E | 1:28 | 2:41 | >5:24 | >8 | HB |
| G | 1:27 | 2:27 | ca 5:13 | >8 | HB |

Key to Table:

STT is set to touch time; 500 g Zapon is an ASTM test method. Empty Zapon is adapted from the 500 g Zapon test, wherein no weight is applied.

Gardner viscosities were determined on the high butyl cellosolve formulation and a formulation thereof diluted 9:1 by weight deionized water. The following table indicates the Gardner viscosities of these two preparations.

| | Gardner Viscosities | |
|---|---|---|
| Resin | High Butyl Cellosolve | 9:1 Dilution |
| C | W | V- |
| E | M | K- |
| G | U- | R |

EXAMPLE V

A paint was prepared utilizing the composition of Example G. A mixture of 40 parts by weight butyl cellosolve, 205 parts by weight of the resin of Example H at 75% NVM, 12.3 parts 28% ammonia solution, 290 parts distilled water, and 211 parts titanium dioxide (Dupont R-960) was prepared. The mixture was ground to a Hegman 6+ in a high speed dispersator (Premier). Thereafter, an additional 75.5 parts of the resin at 75% NVM, 6 parts 28% ammonia solution, 140 parts s-butyl alcohol, 22.6 parts of the dryer premix of Example IV, and 181 parts water were added. The paint had an initial pH of 8.5 and a Stormer viscosity of 130 KU.

Upon application of a paint film to a Bonderite (zinc-treated steel) panel, the following characteristics were observed:

| Dry Times, hours (1 mil, 72% RH, 73° F.) | | |
|---|---|---|
| Set-to-touch | 1:13 | 0:59 |
| Empty Zapon* | 1:47 | 1:33 |
| 500 g Zapon* | 4:26 | 4:55 |
| Through Dry | 6:39 | 6:47 |
| Over Stability, 120° F. | | |
| Initial pH, viscosity | 8.2, 82 | 8.6, 120 |
| Four weeks pH, viscosity | 6.5, 61 | 7.2, 100 |
| Weeks to fail | 5 | 6 |
| Gloss, 60 degree | 95.0 | 90.5 |
| Gloss, 20 degree | 92.4 | 86.2 |
| Reverse impact, in lb | <4 | <4 |

*As defined in Example IV.

This example indicates the properties of a paint applied to an object.

Although preferred embodiments of this invention have been discussed herein, those skilled in the art will appreciate that changes and modifications may be made without departing from the spirit of the invention as defined in and limited only by the scope of the appended claims.

I claim:

1. A method of producing essentially haze-free isophthalic acid-and polymethylolalkanoic acid-containing resins comprising:
reacting isophthalic acid, a polymethylolalkanoic acid, and a polyol in the presence of a catalytically effective amount of a catalyst selected from the group consisting of stannous oxalate, dibutyltin oxide, and tetrabutyl titanate at a temperature of between about 150° C. and 230° C. to produce essentially haze-free resins having an acid number of at least about 30.

2. The method of claim 1 wherein the polymethylolalkanoic acid is selected from the group consisting of dimethylolpropionic acid, dimethylolbutyric acid, dimethylolvaleric acid, trimethylolacetic acid, and blends thereof.

3. The method of claim 2 wherein the polymethylolalkanoic acid is dimethylolpropionic acid.

4. The method of claim 2 wherein the amount of catalyst is up to about 1 wt percent based on total weight of reactants.

5. The method of claim 2 further comprising continuing said reaction until the resin viscosity, determined on an ICI cone and plate viscometer at 125° C. and 100 percent solids, is at least about 10 poise.

6. The method of claim 5 wherein the viscosity is at least about 20 poise.

7. The method of claim 3 further comprising continuing said reaction until the resin viscosity, determined on an ICI cone and plate viscometer at 125° C. and 100 percent solids, is at least about 10 poise.

8. The method of claim 7 wherein the viscosity is at least about 20 poise.

9. The method of claim 1 wherein the acid number of the resin is between about 30 and 75.

10. The method of claim 1 wherein the resin is further reacted with ammonium hydroxide or an amine to improve the water solubility of the resin.

11. The method of claim 2 wherein the resin is further reacted with ammonium hydroxide or an amine to improve the water solubility of the resin.

12. The method of claim 5 wherein the resin is further reacted with ammonium hydroxide or an amine to improve the water solubility of the resin.

13. The essentially haze-free ester produced by the method of claim 1.

14. The essentially haze-free ester produced by the method of claim 2.

15. The essentially haze-free ester produced by the method of claim 7.

16. The essentially haze-free ester produced by the method of claim 5.

17. The essentially haze-free ester produced by the method of claim 12.

18. Protective coating compositions comprising the resin of claim 14.

19. Protective coating compositions comprising the resin of claim 16.

20. Protective coating compositions comprising the resin of claim 17.

21. Objects coated with the composition of claim 18.

22. Objects coated with the composition of claim 19.

23. Objects coated with the composition of claim 20.

* * * * *